INVENTOR.
Roderic M. Scott
BY
Daniel P. Levinson
ATTORNEY.

United States Patent Office 3,542,515
Patented Nov. 24, 1970

3,542,515
DETERMINING REACTION RATES BY SIMULTANEOUS TWO-POINT MEASUREMENTS
Roderic M. Scott, Stamford, Conn., assignor to The Perkin-Elmer Corporation, Norwalk, Conn., a corporation of New York
Filed Aug. 6, 1968, Ser. No. 750,725
Int. Cl. G01n 21/02
U.S. Cl. 23—230
18 Claims

ABSTRACT OF THE DISCLOSURE

In certain types of chemical analysis, e.g., enzyme chemistry, the rate of reaction is the most significant data. The present technique determines this rate of reaction by measuring, as by absorption spectroscopy or colorimetry, the extent of reaction of two otherwise identical samples in which the reactions have started, as by adding an activator, at two different times. This effectively provides a simultaneous measurement of the same reaction at two different points in time of the continuing reaction. In this manner, the instrumentation is utilized a minimum amount of time for each sample, allowing many samples to be run, say, per hour, no "memory" storage of one set of partial data is required, and the simultaneous measurement is substantially free of variable random fluctuations and errors. Where the reaction is such that the measured quantity, e.g., absorbance, varies linearly with time, a relatively extensive (in time) measurement may be made, and the results averaged, to improve the signal-to-noise ratio, since the difference in absorbance of the two reacting samples is invariable with time, being the constant ordinate difference between two parallel straight line segments on an absorbance versus time graph.

GENERAL DESCRIPTION

This invention relates to a technique and apparatus for measuring the rate of a chemical reaction. More particularly the invention measures a changing physical characteristic of a progressing chemical reaction (e.g., change of color or opacity as measured by colorimetry or absorption spectroscopy) at two different stages of the reaction, so as to determine the extent of reaction change (and therefore the reaction rate) between these two conditions. The novel manner in which this data is simultaneously obtained and the advantages thereof will become evident from the following description.

In certain fields of analytical chemistry, and in particular clinical chemical analysis, it is the rate of chemical reaction rather than any static condition of the reaction which is the significant analytical data. This is true in enzyme chemistry, which is of importance not only in its own right, but also as a technique for quantitative analysis of certain types of samples of clinical (i.e., medical) interest. To measure such reaction rates by known types of analytical instruments (for example, absorption spectrometers or colorimeters) presently requires either: (a) the recording of the measured physical characteristic (e.g., optical absorption) as a function of time over a period quite long compared to time required for the instrument to make a single measurement; or (b) two measurements of this physical characteristic, which are well separated in time with the first measurement being stored in some type of memory. If the first (a) technique is utilized, the "instrument time" for a single analysis is quite lengthy, so that the number of samples which may be measured by a single system, say, per hour, is low. If the second (b) technique is utilized and a series of samples are measured the first time, then the same samples recycled to the system so as to make the second measurement later, a data "memory" of considerable capacity (and therefore expense) and a sampling mechanism of considerable complexity are both required. More fundamental theoretical disadvantages are involved in both methods. The ultimately desired data is a function of the difference between the first and final measurement of a given sample; where this difference is small relative to the two separate measured values, the precision and signal-to-noise ratio in the ultimate data is much lower than in each of the two individual measurements from which it is obtained. Additionally, the stability of the instrumentation is a major factor in the precision of the two measurements, which are made at two different, considerably spaced times.

The present invention eliminates essentially all of both the practical and theoretical disadvantages of prior techniques. This is accomplished by making a simultaneous measurement of two otherwise identical samples in which the analyzed reaction has started at two different known earlier times. The difference in the physical characteristic being measured (e.g., absorption) of the two similar samples may be directly read out as the desired data. Such a technique may be carried out by utilizing a series of paired cells which are moved at a known rate by an accurately timed conveyor (for example a rotary table) toward the measuring station where both cells of each pair may be simultaneously analyzed (preferably by a direct comparison of the type analogous to that used in conventional "double beam" analytical optical instruments). The reaction in one of each pair of cells will be started at a time different by a known amount from the start of the reaction of the other one of each pair. This may be accomplished, for example, by adding the second (or last) of the two (or more) reactants to the cell at different parts of the travel of the cells along the conveyor. For enzyme type reactions, addition of the "activator" effectively controls when the reaction will start. Thus, the original sample material and any additional reagents may be added (in any convenient time sequence) during one or more convenient early stages of travel of the cells along the conveyor; the activator will then be added to one of the cells of each pair at a first particular location, and then added to the other of each pair of cells at a later, different location along the conveyor (e.g., rotary table) path. The physical characteristic (e.g., opacity, color or the like) utilized to determine the stage of the reaction for both cells in each pair may then be simultaneously measured at a third location of the conveyor, further "upstream" of their movement. If the reaction starts (i.e., the last reactant or the activator is added) in one (the "$a$" cell) of the cells at time $T_a$ and in the other ("$b$") cell of the pair at the later time $T_b$, while the simultaneous measurement is made at the still later time $T_m$, then the reaction in the "$a$" cell (in which the reaction started earlier) will have progressed for the time period $T_2$ equal to $T_m - T_a$, and the reaction in the other "$b$" cell will have been occurring for the (shorter) time period $T_1$, equal to $T_m - T_b$, at the time that the simultaneous measurement is made. The reaction rate may therefore be determined directly by comparison of the state of reaction after these respective times $T_2$ and $T_1$.

In certain reactions, a simple mathematical relationship may exist between the measured characteristic (expressed in the appropriate form) and the rate of reaction or other sample data desired to be ultimately determined. In some situations, the measured characteristic is, for example, a linearly varying function of time during at least an appreciable time interval of the reaction, and the analytically meaningful data is the relative change of this characteristic. In this type of case, the difference in the physical characteristic in the two sample cells is invariable as long as the reaction in each is progressing along the same type of curve (e.g., segments of two parallel straight lines). Under such conditions, the desired difference may be measured over a conveniently long time, so as to improve the signal-to-noise ratio of the measurement (using a moderately long time-constant averaging circuit, for example).

For example, in certain types of enzyme reactions, the absorbance, i.e., the negative logarithm to the base 10 of the reciprocal of the transmissivity expressed as a decimal, i.e., $$\left(-\log \frac{1}{T'}\right)$$

of the solution is a linear function of time. See for example "A Continuous Spectrophotometric Method for Measuring the Activity of Serum Alkaline Phosphatase" by G. N. Bowers, Jr. and R. B. McComb in "Clinical Chemistry," vol. 12, pp. 70–89 (1966). If the rate of change of absorbance is also proportional to the original concentration of the sample substance (e.g., the enzyme) being analyzed, we may write:

$$\frac{dA}{dt} = KC_o \quad (1)$$

wherein: $C_o$ is the (desired to be known) concentration of the sample component being analyzed, A is the absorbance, and K a constant determined by the reagents and temperature.

Integrating Equation 1 yields:

$$A = KC_o t + A_o \quad (2)$$

wherein $A_o$, the constant of integration, is obviously the absorbance of the mixture prior to any reaction.

The absorbances of the same or identical mixtures at two different times after the start of the reaction will be given by:

$$A_1 = KC_o t_1 + A_o \quad (3a)$$
$$A_2 = KC_o t_2 + A_o \quad (3b)$$

where the subscripts 1 and 2 indicate the values at these times ($t_1$ and $t_2$).

The absorbance of an element (for example, a sample solution) is defined by:

$$A = \log \frac{I_o}{I} \quad (4)$$

wherein:

A is the total actual absorbance of the element;
$I_o$ is the intensity of the radiation incident on one side of the element; and
I is the intensity of the radiation transmitted through the element.

If the same (for example, enzyme reaction) sample solution, conforming to Equations 1 through 3b above, is measured by an absorption instrument at two different stages of the reaction, namely after the shorter time $t_1$ and then after the longer time, $t_2$, the difference in the measured absorbances will be:

$$A'_2 - A'_1 = \log\left(\frac{I_2}{I_{o2}}\right) - \log\left(\frac{I_1}{I_{o1}}\right) = KC_o(t_2 - t_1) \quad (5)$$

wherein: $A'_1$ and $A'_2$ are the measured absorbances after the reaction has progressed from its starting point for the shorter time of $t_1$ and the longer time $t_2$, respectively; $I_1$ and $I_2$ are the respective intensities of the beam transmitted by the sample solution at these same two measured times; $I_{o1}$ and $I_{o2}$ are the respective intensities of the incident beam on the sample during the two different measurements; and the right-hand term of the equation is directly obtained by subtracting 3a from Equation 3b.

If the measured absorbances $A'_1$ and $A'_2$ are relatively large compared to their difference (as is often the case in practice), a relatively small percentage error in each of these measured absorbances can cause a large relative error in their difference (which is the ultimately utilized quantity to determine the concentration $C_o$ of the desired-to-be-measured sample component). Further, any variation in an instrument parameter, affecting the two measured absorbances differently, will cause different systematic errors in the two measured absorbances, which errors therefore will not cancel.

The present invention simultaneously measures the absorbances of two identical sample solutions, one of which has been reacting for a period, $T_1$, and the other of which has been reacting for the longer period, $T_2$. By utilizing a single light source to form the incident beam on both samples (e.g., in a manner analogous to that of conventional double-beam spectrophotometers), the invention (a) avoids the necessity for storing a first absorbance measurement and then subtracting a second absorbance measurement, (b) avoids the substantial increase in the relative error in the final measurement, occasioned by subtracting two large quantities to obtain a small difference, (c) eliminates the adverse effects of differing systematic error (i.e., the need for an extremely stable instrument), and (d) allows the use of averaging techniques in the measurement, thereby greatly increasing the signal-to-noise ratio, where the measured quantity (say, $A'_2 - A'_1 = \Delta A$) is invariable over a significant period of time (which is true for a reaction of Equation 1 type, as will be more clearly seen hereinafter). By placing each of the two otherwise identical sample solutions which have been reacting for different times in, respectively, the reference cell and sample cell of a double-beam instrument (which may be closely analogous to conventional double-beam absorption spectrophotometers), one obtains data according to the following equation:

$$\Delta A = A''_2 - A''_1 = \log \frac{I_2}{I_o} - \log \frac{I_1}{I_o} = KC_o(T_2 - T_1) \quad (6)$$

wherein:

$\Delta A$ is the measured absorbance difference between the two (identical except for their reaction time) samples;
$A''_1$ and $A''_2$ are the absorbances, respectively, of the two samples, which individual absorbances are not actually separately measured;
$I_1$ and $I_2$ are the same as in Equation 5, but $I_o$ is the necessarily identical intensity of the incident beams falling on both sample solutions, because of the simultaneous double-beam technique utilized; and
$T_1$ and $T_2$ are the respective periods of time that each of the two otherwise identical sample solutions have been reacting at the time of the simultaneous measurement.

Equation 6 above may be rewritten (dropping out the unmeasured quantities) as:

$$\Delta A = \log\left[\frac{I_2}{I_o} \cdot \frac{I_o}{I_1}\right] = KC_o(T_2 - T_1) \quad (6a)$$

which may be simplified to:

$$\Delta A = \log\left(\frac{I_2}{I_1}\right) = KC_o(T_2 - T_1) \quad (6b)$$

If the double-beam instrument utilized is of the so-called optical null type, a variable radiation attenuator (i.e., a so-called optical "wedge") may be positioned in the beam passing through the less absorbent sample (number 1), either before or after the sample location, in order to reduce the intensity of this beam so that it equals the intensity of the less intense beam which is passed through the more absorbing sample (number 2). Thus, at balance or null, the variable optical wedge will be so positioned that:

$$I_2 = WI_1 \quad (7)$$

wherein W is the relative transmissivity (a number less than 1) of the part of the optical wedge actually in the beam passing through sample number 1. Under such conditions the absorbance of sample number 2 and the combined absorbance of the optical wedge and sample number 1 are of course equal, so that $\Delta A$ is nulled. Thus, under balanced or nulled conditions, we may write:

$$\Delta A_n = \log\left(\frac{I_2}{W_n I_1}\right) = 0 \qquad (8)$$

wherein the subscrips of $n$ in $\Delta A_n$ and $W_n$ indicate that these are the null values of the difference in total measured absorbance and the attenuating factor of the optical wedge, respectively.

From either Equation 7 or 8 one may obtain directly:

$$\log\left(\frac{I_2}{I_1}\right) = \log W_n \qquad (9)$$

Substituting for the left-hand term in Equation 9, the equal right-hand term from Equation 6b yields:

$$KC_0(T_2 - T_1) = \log W_n \qquad (10)$$

which may be rearranged to yield:

$$C_0 = \frac{\log W_n}{K(T_2 - T_1)} \qquad (11)$$

From this last Equation 11 it may be seen that the desired original concentration of the sample component (reactant) desired to be measured is directly proportional to the logarithm of the attenuation factor provided by the optical wedge at null, divided by both a constant (determined from the known reaction conditions) and the difference between the time periods that each of the two otherwise identical sample solutions have been reacting prior to measurement. Thus, both numbers in the denominator of the right-hand term of Equation 11 will be known constants for a particular set of analyses. If an optical wedge having a linearly varying transmissivity factor is utilized, the quantity $\log W_n$ may be directly obtained by any logarithmic conversion means (such as a logarithmic potentiometer in an automatically balancing servo system). Alternatively, the optical wedge itself may have a logarithmically varying transmissivity, so that its position is directly proportional to the logarithm of its transmissivity factor; in this case the optical wedge position at balance may be directly utilized (again typically as a linear servo output). In either case, the desired concentration may be directly read out from the double-beam absorbance measurement instrument (e.g., double-beam absorption spectrophotometer, double-beam colorimeter, or the like), once the reaction constants (e.g., reagents and temperature) and the difference in time periods of reactions have been chosen. These constants of the particular analysis may be readily set into the instrument, say, manually by any well known technique, such as adjusting the gain of amplifiers in the readout or computing circuits.

It should be noted that the present invention compares directly the intensity of the radiation transmitted by the (two otherwise identical) sample solutions at different stages of the reactions, as per Equation 6b (if an instrument operating on a principle other than optical null is used) or Equation 8 (for an optical-null type instrument). Since the intensity ($I_2$) of the beam transmitted through the more absorbing sample (corresponding to the longer reaction time $T_2$) is necessarily closer in value to the transmitted intensity through the less absorbing sample solution (namely $I_1$) than to the original beam intensity ($I_0$), this measurement may be made at higher precision than possible for the measurement required according to the middle term of Equation 5, since $I_{o2}$ in that equation is necessarily much greater than $I_2$. As noted previously, the present technique does not require an unusually stable instrument (over a long period of time), a large storage means for temporarily "remembering" a series of absorption values, or any circuits (or manipulative steps) to subtract two sets of absorption values.

For a reaction of the type of Equation 1 or 2 where the measured characteristic A is a straight line function of time (since not only K but $C_o$, the initial concentration of the sample component desired to be found, are constants), the quantity measured according to the inventive technique (i.e., $\Delta A$ in Equation 6b or the corresponding $\log W_n$ of Equations 9 through 11) is invariable over such straight-line portions. Thus, as may be seen, for example, from Equation 6b, the measured absorbance difference, $\Delta A$, is a function only of the constants K and $C_o$, and the difference between $T_2$ and $T_1$. Thus, if the measurement is made for a moderate length of time on straight line portions of the reaction curves for both sample cells, the reaction time for each changes by the same amount. Designating the measurement time $\Delta t_m$, we may write the obvious identity:

$$(T_2 \mp \Delta t_m) - (T_1 \mp \Delta t_m) = T_2 - T_1 \qquad (1a)$$

Thus, the measurement may be made over a reasonably long time (rather than instantaneously) without adversely affecting the precision of the measurement. This finite period of measurement allows the use of averaging techniques (i.e., the time constant of the readout may be made, for example, a substantial fraction of a minute long) so as to greatly enhance the signal-to-noise ratio (by reducing the effect of random "noises" in the detector and other parts of the measurement instrument). In this manner, the inventive technique has the further advantage of yielding improved precision in all such (linear relationship) types of reactions.

Accordingly, an object of the invention is the provision of an improved apparatus and technique for obtaining quantitative data concerning a sample component from a reaction of the type in which a measurable characteristic of the sample mixture changes with time in a known manner as a function of the desired-to-be-determined original sample component property (e.g., concentration).

A similar object is the provision of an apparatus and technique for the above purpose, in which the characteristic is measured effectively at two different stages of the reaction, having one or more of the following improved characteristics: greater precision, simplified data handling and storage requirements, reduced requirements as to long-term stability of the apparatus, improved signal-to-noise ratio, and greater number of analyses per unit time.

A further object of the invention is the provision of an instrument for performing an analysis of the above type, in which the desired original concentration of the sample component may be directly read out and/or recorded.

Additional objects, features and advantages of the invention will be obvious to one skilled in the art upon reading the following detailed specification in conjunction with the accompanying drawings, in which.

Figure 1:
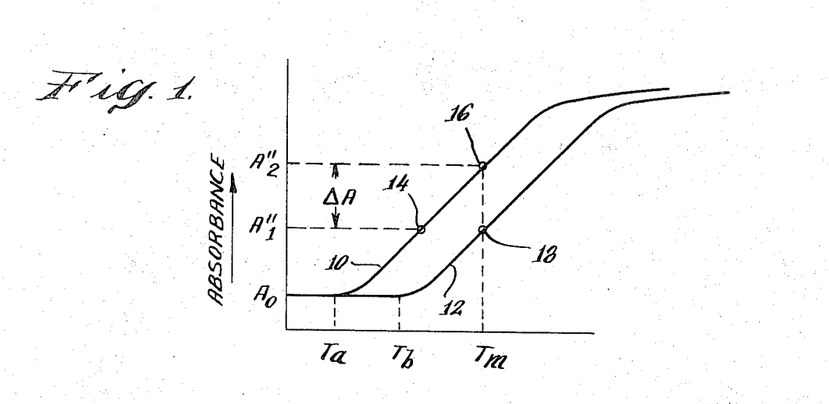
FIG. 1 is a graphical representation of the change in absorbence of otherwise identical reactions starting at different times.

FIG. 1 shows in graphical form the absorbance change with time of certain types of reactions e.g. the enzyme reaction discussed, for example, in the G. N. Bowers, Jr. and R. B. McComb article entitled "A Continuous Spectrophotometric Method for Measuring the Activity of Serum Alkaline Phosthatase" in Clinical Chemistry, vol. 12 (1966) pp. 70–89. In particular, FIG. 1 shows how the absorbances of two otherwise identical sample solutions change if the reaction in one is started at a different time than the other. Thus, the first curve, designated by reference numeral 10, represents the absorbance (of a particular original concentration of components) of a sample solution undergoing a reaction of the type in which the absorbance increases linearly with the time, which reaction started at the time $T_a$. Thus, curve 10 has a central portion which is substantially a straight line, having the slope ($dAdt$) which is proportional to the original concentration of the analyzed sample component, as shown by Equation 1. The slope of this straight line portion can in theory be obtained by measuring the absorbances of a single solution at two known times after the start of the reaction (i.e., time $T_a$ for curve 10 in FIG. 1) according to Equations 3a and 3b. Such measurement of a reaction at two different times involves the practical and theoretical difficulties previously explained.

The technique of the present invention starts a reaction at a later time ($T_b$) in a second sample solution which is otherwise identical to the first one. The second sample solution will therefore exhibit an absorbance versus time relationship as indicated by curve 12 in FIG. 1. Instead of measuring the absorbance of a single sample solution at two different times (as at points 14 and 16 on curve 10), the invention measures simultaneously the absorbances of two otherwise identical solutions (represented by curves 10 and 12) in which the reactions have started at two different times ($T_a$, $T_b$). Thus, a simultaneous measurement of the respective absorbances ($A''_2$ and $A''_1$) of both solutions, made at time $T_m$ (at points 16 and 18) can yield the absorbance different ($\Delta A$) in the manner indicated in Equations 6, 6a, 6b. The times ($T_2$ and $T_1$) in these equations are of course the time that each reaction has been progressing, given by $T_m - T_a$ and $T_m - T_b$, respectively. From FIG. 1 it may be seen that the absorbance data obtained at point 18 from the later to start reacting sample is theoretically of the same value as would be obtained at the corresponding reaction time (namely, at point 14) on the earlier starting reaction sample. Thus, the desired original concentration of the sample component being measured may be determined directly by reading the difference in absorbance ($\Delta A$) of the two sample solutions, by means of Equation 6b, which may be more conveniently utilized in the following form:

$$C_0 = \frac{\Delta A}{K(T_2 - T_1)} \qquad (6c)$$

Any type of double-beam photometric instrument (e.g., a double-beam spectrophotometer) may be utilized to yield directly $\Delta A$ for use in Equation 6c. Since both K and the difference between $T_2$ and $T_1$ (which is of course equal to the difference in the starting times, $T_b - T_a$) will be constant in repetitive analyses of different samples, the absorbance readout of such an instrument may be automatically converted to the desired original concentration of the sample component by relatively simple circuits (i.e., variable gain amplifiers). Thus, the desired concentration may be obtained essentially automatically from many different types of double-beah photometric instruments.

It should also be noted from FIG. 1 that the difference in the absorbance ($\Delta A$) between those portions of curves 10 and 12 where both have straight line segments is invariable. Thus, this $\Delta A$ may be measured over a relatively extensive period of time (say, through a time interval on both sides of the nominal measurement time, $T_m$) and the measurement averaged so as to substantially improve the signal-to-noise ratio (and therefore the precision) of the $\Delta A$ determined.

If a double-beam photometric instrument of the optical null type (i.e., wherein a variable attenuating "optical wedge" is positioned in the more intense radiation beam to equalize it with a less intense one) is utilized, then the absorpton factor at null of this optical wedge may be utilized according to Equation 11. As previously noted, the position (and therefore the attenuation factor) of the wedge may be supplied as the electrical output of either a linear or logarithmic potentiometer (depending on the type of wedge used) forming part of the automatic servo system for moving the wedge into the null position. Double-beam absorption measuring instruments (e.g., spectrophotometers) utilizing variable optical wedges which are automatically positioned into null relationship by servo motors are of course well known in the art.

The remaining figures of the drawing illustrate, in partly schematic form, one exemplary apparatus for performing a series of analyses utilizing the invention in conjunction with an optical null-type of double-beam instrument (i.e., utilizing the relationship of Equation 11). As stated immediately above, other types of double-beam (i.e., differentially measuring) instruments yielding absorbance difference ($\Delta A$) outputs may be readily used instead, nor is it critical what type of absorbance measuring instrument is utilized (i.e., a spectrometer, colorimeter or the like).

Figure 2:
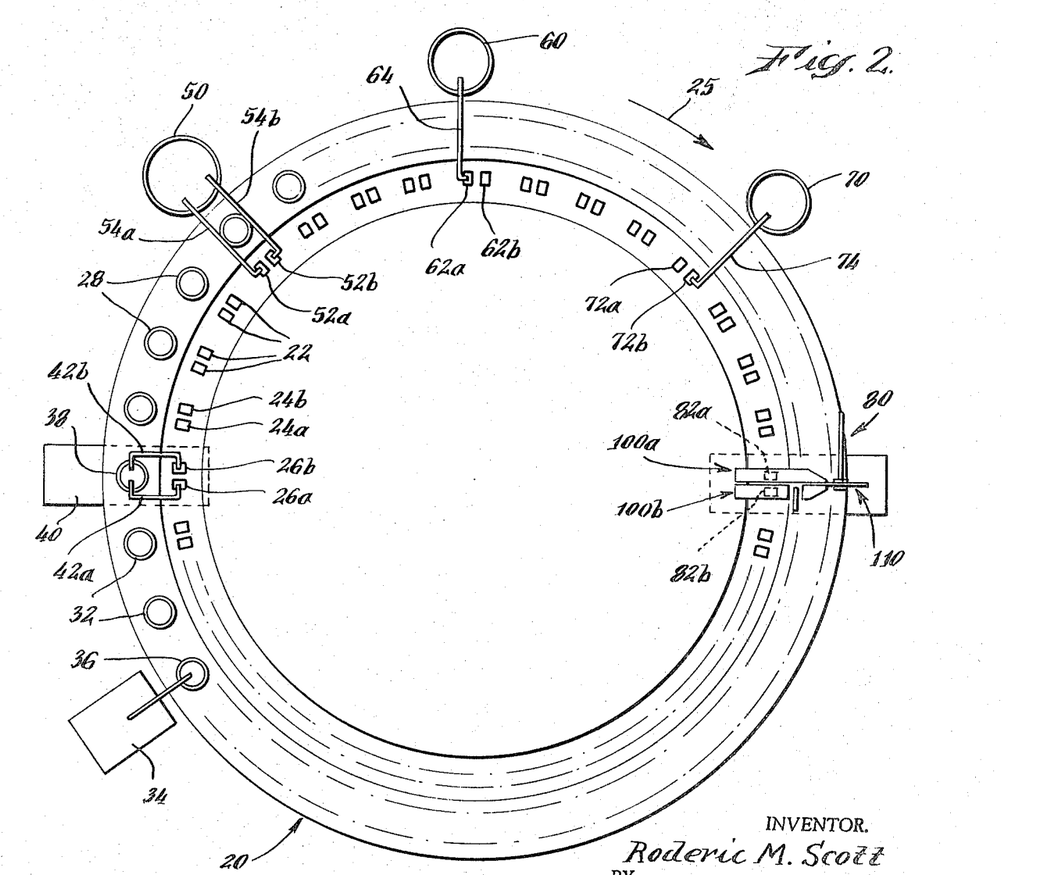
FIG. 2 is a partially schematic illustration of an exemplary embodiment of an entire apparatus according to the invention.

FIG. 2 schematically illustrates at 20 an automatic sampling system, of a commercially available type, in which a series of sample cells 22 may have placed therein both various sample solutions and one or more common reagents. In such automatic sampling tables, typically a series of original samlpe holders are arranged peripherially at a given radial distance from the center of the table and a second series of ultimate sample receptacles or cells are arranged also in a circumferential series at a different radial distance. A mechanism for transferring a measured quantity from the original sample holder to at least one of the final sample cells is provided at one "station" about the edge of the table, and at one or more different stations (which may precede or follow the sample adding station). Means are provided for adding (typically the same) reagent or reagents to each of the final sample cells. At a point "downstream" (relative to the table movement) of all such sample and reagent adding stations, some form of an anlytical instrument is provided to measure some characteristics of the resulting sample and reagent solution. Such an analytical instrument may be for example, a pH meter, a photometric instrument (e.g., a spectrometer, colorimeter or the like), or other type of apparatus which may measure some physical or chemical characteristic of the solution. Since the table rotates at a known speed, the measurement made at the analysis station bears a known relationship to the time of addition of each of the components to the solution. Thus, a time-dependent analytical measurement may be made under highly reproducible circumstances. In addition, such tables are usually provided with some means (for example, a thermostatically controlled temperature bath) for controlling the temperature of at least the final sample cells. Since such automatic sampling tables are commercially available from a variety of amnufacturers, and since some may need modification to some degree to be suitable for forming part of the apparatus suitable for practicing the present invention, a short description of the pecific functional capabilities desirable in the exemplary embodiment is schematically illustrated in FIG. 2. It should be noted however, that the exact details of the basic automatic sampling table form no part of the present invention.

The series of final sample cells 22 are arranged as indicated in FIG. 2 so as to form a series of paired cells, such as indicated at 24a, 24b and at 26a. The entire table 20 is assumed to be rotating at a controlled known rate in a clockwise direction (as indicated by arrow 25) so that the particular pair of final sample cells indicated at 24a, 24b will reach any given fixed radio station prior to the cells designated 26a and 26b. At a peripheral location closer to the table edge are a series of original sample receptacles 28. As indicated in FIG. 2, only one-half as many original sample receptacles (28) as final sample cells (22) are required, each holder 28 being associated with a pair of cells 22. At a particular "early" station of the rotating table, each of the holders 28 will be supplied as by tube 30 with a different original sample, which is desired to be analyzed. A sample dispensing mechanism, schematically illustrated at 34, will serially supply the different samples through tube 30 to the different holders 32 as they are stepped under tube 30. Thus, all of the sample holders more clockwise than the particular holder 36 shown at the sample dispensing station, will be filled with a different sample material to be analyed. At a station more clockwise than the sample dispensing station, a sample transfer device 34 will cause the transfer of equal amounts of the same sample material (i.e., from sample holder 38) to be transferred to each of the pair (26a, 26b in FIG. 2) of final cells associated therewith, through tubes 42a and 42b respectively. Thus, each pair of the final sample cells (22) which are clockwise of the particular final cells 26a and 26b (for example 24a and 24b) will contain an equal amount of the same sample material for each pair.

At the next station a reagent dispensing mechanism will cause an equal amount of a reagent (or mixture of reagents) to be dispensed from reagent container 50 to both of the final cells in a particular pair (52a and 52b in the position of FIG. 2) through tubes 54a and 54b. In the illustrated embodiment of FIG. 2, it is assumed that the reaction which is intended to be monitored by the apparatus will not start upon the addition of the reagent or reagents transferred from receptacle 50. In other words the reaction is of the type that requires the addition of some further ingredient, which is added to the final sample cells at a later time, as now described.

Receptacle 60, further "down-stream" than all of the previous described stations, contains a reagent (hereinafter referred to as the "activator") which causes the intended reaction to start. As will be noted from FIG. 2, the activator is added to only one of the pair of cells (namely 62a) by tube 64, so that the reaction will start in this cell but not in its paired cell (62b) at this time. Receptacle 70, still further "down-stream" contains the same activator as present in the receptacle 60, and is added through tube 74 only to that cell (the "b" cell) of each pair which has previously not received activator from receptacle 60. Thus, the reaction will start in those cells of each pair designated by the subscript "a" at an earlier time (corresponding to time $T_a$ in FIG. 1) than for the other member of each cell pair (i.e., the "b" cells).

Thus, the reaction in the various "a" cells will start to follow curve 10 in FIG. 1 when the activator is added by receptacle 60 thereto, while the solution in the "b" cells will not start until a later time (corresponding to $T_b$) to follow the upwardly extending curve 12. At a later point in the cell travel, both of the cells will be simultaneously analyzed and compared by an instrument, hereinafter assumed to be a doublebeam optical photometric instrument, indicated generally as 80. This point of table travel of course corresponds in time to that indicated in FIG. 1 at $T_m$. The analytical instrument 80 will measure, as previously generally described, for example, the relative (i.e., difference in) absorbance of each paired cells (82a and 82b being measured in FIG. 2).

Figures 3, 4, 5:
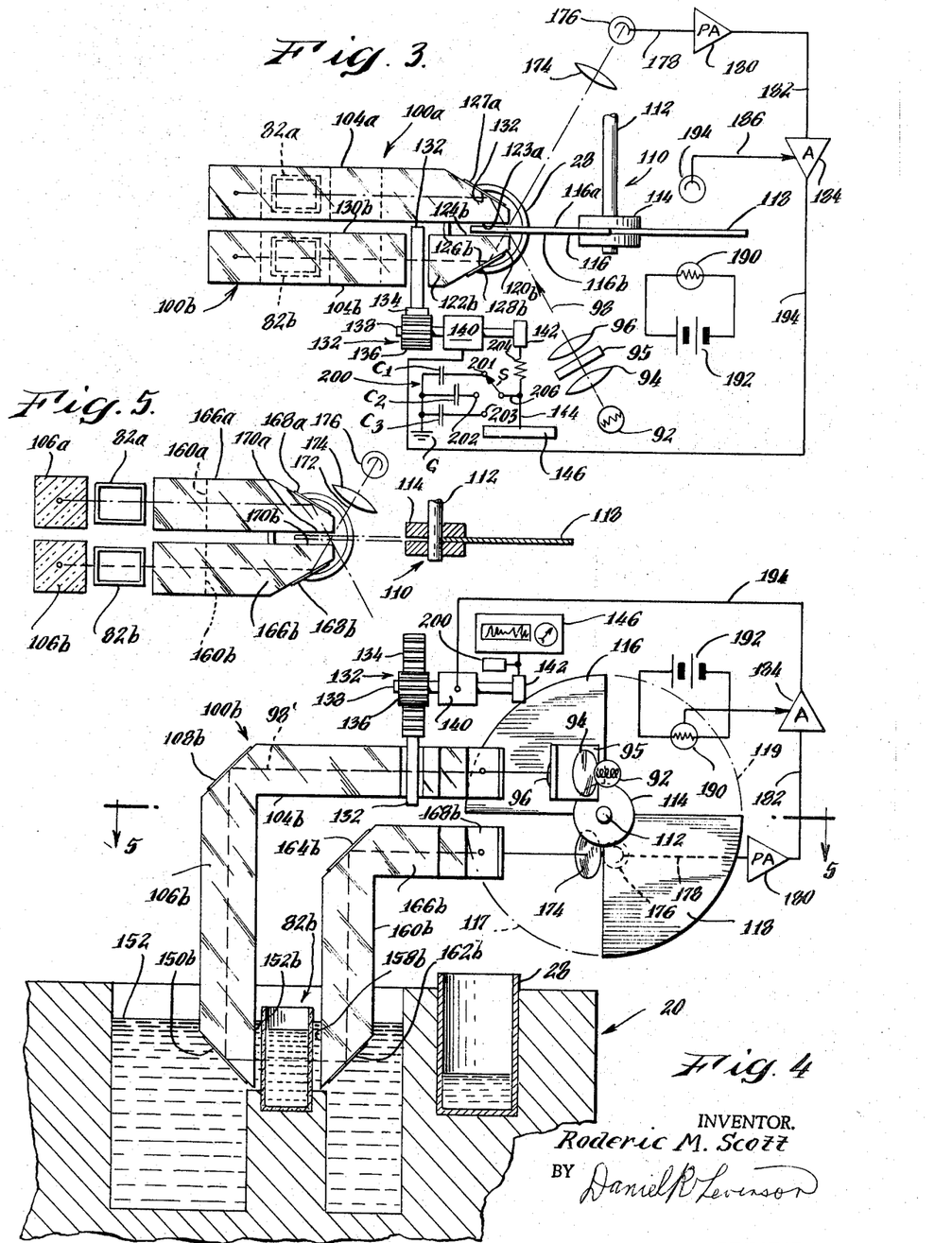
FIG. 3 is a partially schematic plan view of an exemplary double beam optical instrument forming part of the apparatus of FIG. 2.
FIG. 4 is a side view of the same instrument as in FIG. 3, and showing its relationship to the sample conveying table.
FIG. 5 is a horizontal section taken generally on the line of 5—5 in FIG. 4.

FIG. 3 illustrates in somewhat schematic form an exemplary double-beam analytical instrument 80 which may be utilized for comparing the contents of the pair of cells 82a and 82b. In FIG. 3, radiation from source 92 is collected by condensing lens 94 and collimated by lens 96 so as to form a collimated beam of radiation traveling in the direction indicated by ray 98. For illustrative purposes it is assumed a simple optical filter (which may be of the interference layer type) at 95 is positioned in the optical system so as to limit the transmitted radiation to a relative narrow wavelength spectral band. Other more sophisticated types of means for isolating such a wavelength band (for example, a variable monochromator) may be utilized instead and positioned elsewhere in the instrument. Thus, it is assumed for purposes of explanation that the instrument is a double-beam spectrophotometer, testing the relative absorbance at a single wavelength region (which region of course can be changed by substituting different filters), although almost any type of double-beam analytical optical instrument may be utilized in place of the simple double-beam spectrophotometer illustrated in the exemplary embodiment. The collimated radiant beam is caused to alternately pass through the two sample cells (82a, 82b), by means, for example, of two light channeling assemblies, showing generally at 100a and 100b. These assemblies may be similar except that 100b includes a discontinuity (generally shown at 102) which need not be present in assembly 100a. As may be seen by comparing the plan view of FIG. 3 and the side view of FIG. 4, each of these light channel assemblies include a generally horizontal portion 104a, 104b and generally downwardly extending vertical portion 106a (see FIG. 5) and 106b (FIGS. 4 and 5). A reflecting portion 108b (FIG. 4) connects each of the horizontal light sections of these light channel assemblies so that light proceeding generally toward the left through the horizontal portions (104a and b) will be reflected downwardly through vertical portions (106a and b). Whether the radiation beam 98 will so enter the light channel system 100a or that at 100b will be determined by the monetary position of a rotating reflective chopper shown generally at 110. This chopper assembly may include a rotatively mounted shaft 112, a rigidly attached hub-portion 114, in which is rigidly supported the chopper blades 116 and 118 (see FIG. 4). The exemplary chopper consists of two such reflecting 90° sectors separated by two 90° open (or transparent) spaces (at 117, 119 in FIG. 4). Both surfaces of blades 116 and 118 are rendered highly reflecting (as by coating or polishing).

Radiant beam 98 will preferably bypass (or else pass through) the angled transparent surface 120b of the right-hand-most part 122b of one (100b) of the light channel assemblies so as to bypass (or pass through) element 122b When one of the reflecting blades (116 in FIG. 4) is positioned in this beam, the beam will be reflected from blade surface 116b through surface 124b into element 122b, striking the surface 120b at point 126b. Since this part of the surface is coated with reflecting material as indicated at 128, the beam will be reflected to the left in FIG. 3 so as to pass out of element 122b through space 102 into the portion 130b of this light channel system. A variable (in optical density) "wedge" or attenuator 132 is adjustably positioned in opening 102. This adjustment may be caused, for example, by having a toothed track 134 engaged by pinion 136, rigidly mounted on shaft 138. This shaft is adjustably rotated by a phase sensitive motor 140 so as to move the optical attenuator in to its desired position, as will be explained hereinafter. Shaft 138 also is rigidly attached to a potentiometer 142 of the type conventionally used in servo systems, so as to yield an indication of the rotative position of elements 136–140 and therefore of the linear position of attenuator 132. This positional data in electrical form may be provided over lead 144 to a read out or recording device 146 of any conventional form, preferably after "averaging" by circuit 200 as will be described hereinafter.

After passing through attenuator 132, the beam as 98' will be deviated by the reflecting surface 108b (see FIG. 4) downwardly through portion 106b until it strikes a second canted reflecting surface 150b. As shown in FIG. 4, the lower portion of vertically extending part 106b of the light channels will enter into the thermostatically controlled liquid bath 152 (if present) of the table. Thus, the twice reflected radiation beam will pass through surface 152b of the light channel member through the bath liquid and through the transparent walls and sample solution of cell 82b. After once again passing through the liquid bath, the beam will reach and enter transparent surface 158b of an exit or lower light channel member 160b. The beam will be reflected from canted mirror surface 162b up through this light channel member and again be reflected at upper canted mirror surface 164b so as to pass along horizontal portion 166b of the exit light channel system.

As best seen in FIG. 5, the radiation beam will be deflected by the angled reflected surface 168b so as to emerge through transparent surface 170b of horizontal portion 166b. For the chopper position shown, the radiation will then pass through opening 117 so as to emerge along ray path 172. The generally still collimated beam at 172 will typically be focussed by an optical system (schematically represented by lens 174) to a relatively small area on a photosensitive detector 176. As is well known, this detector (which may be a photo multiplier, bolometer, or any other conventional photosensitive device) will therefore provide an electrical output at 178 which is proportional to the intensity of the radiation beam falling thereon. This electrical output will typically be amplified, as by preamplifier 180, the output of which at 182 will then be fed to a synchronous amplifier (or demodulator) 184. The synchronizing or phase reference signal to the synchronous amplifier 184 may be supplied at 186 from any conventional means. As an example, a small light source 190, powered by power supply 192 may be positioned on one side of the chopper (compare FIGS. 3 and 4) and a small photosensitive detector 194 may be positioned on the other side, so that an electrical signal is present on synchronizing input 186 whenever an open (or transparent) sector of the chopper blade, such as at 119 in FIG. 4, is present between the light source and detector 190, 194. The synchronously demodulated (D.C.) output of the amplifier 184 will be fed over lead 194 to motor 140. As is well understood in double beam optical instruments, such as signal processing system will supply (at 194) a D.C. output which has a polarity determined by which of the two alternate series of signals at the detector output (178) is greater, and a D.C. amplitude proportional to the amplitude of this difference. Thus, the output of the synchronous demodulator or amplifier 184 may drive motor 140 so as to reposition the variable attenuator 132 in the "reference" beam (i.e., the "b" side of the apparatus) in order to equalize the amplitude of the beam after it is passed through the "b" cell and attenuator to that of the amplitude after it is passed through the (more absorbing) "a" cell.

When the chopper 110 has rotated 90° from the position shown in FIGS. 3–5, the collimated beam from source 92 at 98 will pass through the opening (which will be present at the location of blade 116 in FIG. 4) and directly through transparent surface 123a, so as to be reflected by canted mirrored surface 127a (in a manner analogous to that described relative to surface 128b of the other "b" light channel system). Since the path through the light channel system 100a and the "a" sample cell (e.g., 82a) is essentially the same as for the light channel system 100b already described (except of course for the absence of any optical attenuator in the "a" channel system), this description is not repeated. However, on emergence from the transparent final surface 170a of the horizontal portion 166a of the exit part of the "a" light channel system (see FIG. 5), the beam will be incident on the rear reflecting surface of the chopper blade which will now be in the position of opening 117 in FIG. 4. Assuming blade 116 to be the one so positioned, the beam will be reflected from its rear surface 116a in the direction (along 172) toward detector 176. Thus, for this position of the chopper (90° turned from the position of FIGS. 3–5), the detector will "see" the original radiation beam after absorbance by the "a" sample. Thus, the detector will alternately receive the same radiation beam after absorbance by the "b" cell and the attenuator 132, and then after absorbance by the "a" cell. The balancing means (elements 136–140 and 176–194) will then cause equalizing the intensities of these two beams as already described. The synchronizing pulse generator 190–194 provides the information as to chopper blade position (over lead 186) to as to allow the synchronous demodulator 184 to yield a D.C. signal which is essentially the algebraic difference of the light intensity (expressed preferably in a logarithmic scale as previously noted) in the "a" and the "b" beams reaching detector 176, in the well-known manner already generally described.

In order to improve the signal-to-noise ratio, the inventive technique (and exemplary instrument) preferably takes advantage of the fact that the desired quantity to be measured, $\Delta A$ (see Equation 6c for example) or in an optical-null instrument more directly, log $W_n$ (compare Equation 11, for example) is constant throughout the time a single pair of samples are in the measuring instrument, for analyses of the type represented by, for example, the straight line segment parts of the curves in FIG. 1. As previously noted, this is true since $\Delta A$ (and log $W_n$) is a linear function of $T_2-T_1$, which is constant for a given difference in starting times ($T_b-T_a$ in FIG. 1). Thus, the desired $\Delta A$ measurement does not depend on the exact measurement time, $T_m$, and a relatively long measurement time (say about 25 seconds for a one-half minute sample stepping time, or about 50 seconds for a one minute sample cycling time) may be used with the average absorbance value over this period being considered the measured $\Delta A$. A simple averaging or integrating circuit may be used to obtain such average value, virtually free of (short-term) noise fluctuations.

An exemplary simple (variable) RC filter network 200 is shown in FIG. 3 for this purpose. This simple integrator may comprise a suitable value resistance (of, say, R ohms) at 204 in series in lead 144 between the potentiometer 142 output and the input to readout device 146, and a shunting switch S in branch lead 206 connected between the resistor 204 and the readout device 146. Switch S may make contact with any one of a series of stationary terminals (of which three are shown at 201, 202 and 203 in FIG. 3 for exemplary purposes). Each of these terminals is connected through a different size capacitor ($C_1$, $C_2$ and $C_3$, respectively) to provide a shunt path to ground at G. Different time constants ($RC_1$, $RC_2$ or $RC_3$) may thus be chosen merely by moving switch arm to an appropriate terminal (201, 202 or 203, respectively). For example, if the actual absorbance data is available at potentiometer output for about 25 seconds, a time constant of about 4 seconds will greatly increase the signal-to-noise ratio without causing any series problems in the D.C. signal readout from reaching substantially its full value (within less than 1%). If the time the instrument is actually measuring is greater or less than this, the time constant chosen by switch S should be no more than about ⅕ of the actual measuring time (to insure the readout device ultimately "sees" substantially the full value of the D.C. output of the potentiometer). Obviously other types of integration or averaging circuits may be utilized for this purpose instead.

If a continuous chart recorder is utilized as the readout device 146, the D.C. signal may be recorded all the time, and the plateaus consider the actual absorbance measured. For instantaneous readout devices, the recorded value should be the (average) value reached near the end of the actual measurement time. In the later case, a timer (initiated by the sample table stepping pulse) may be used to delay recording to such time (for example, a 20 second delay for 25 second measuring time). Obviously, an analogous data averaging technique may be utilized in other types of double-beam instruments (e.g., those in which the $\Delta A$ is directly read out either as the logarithms of the ratio of the two intensities of radiation after passage through the two samples, or as the difference between the individual logarithms of each of these two intensities).

OPERATION

To perform a series of analyses, a different sample to be analyzed will be added (as by tube 30) to each of the different original sample receptacles, or pre-filled receptacles will be placed on the automatically indexing table 20 at a similar (i.e., at 34) or more "upstream" (i.e., counterclockwise) location. As previously noted, the entire table will rotate clockwise (as indicated at 25) so as to cause each of these original sample receptacles to reach the sample transfer station at 40, wherein each of the two paired final sample cells (e.g., 26a and 26b), associated with one such original sample receptacle, will be filled with an equal amount of the same sample. At one or more reagent dispensing stations (as to 50) each of the paired final cells will be filled with one or more of the reagents involved in the chemical reaction utilized in the analysis. Subsequently, at station 60, only the "a" cell in each pair will be supplied with that reactant (the "activator") which causes the analytical reaction to commence. At a known subsequent time, the other "b" cell will be supplied at station 70 by an identical amount of the same "activator." Therefore, the reaction starts in the "a" cells at a known time, and then starts at a known subsequent time in the "b" cell of each pair. Thus, as any given pair of cells reach the test station 80, the two times of the reactions will each be of known (different) duration.

The automatic sampling table of FIG. 2 is of course only schematically illustrated, since it is of the type commercially available except for the modifications previously noted. Such a table may consist of approximately 100 positions for the original sample receptacles (28) and therefore 100 such pairs of final cells (22), and may be stepped at a rate of one unit of rotation for each half minute, allowing 120 tests per hour to be performed. By adding the activator (at 60 and 70, respectively) to the "a" and "b" cells at appropriately chosen locations along the periphery of the table, the reaction times for each of the "a" and "b" cells prior to its reaching the test station may be made appropriate for a large variety of different analytical reactions. For example, with such a 100 sample station table, intermittently rotating at the rate of one half minute per step, the longer ("a") reaction time may be chosen to be as long as about 20 minutes, and the shorter reaction ("b") reaction time may be up to a few minutes less than this. Obviously, the stepping rate of the table may be changed (e.g., to one minute) to change by a known factor the reaction times of both of the cells to be compared, while changing the location of either activator adding station 60 or 70 can change the relative length of time of the two compared reactions.

As each of the otherwise identical cells of each pair reached the testing station, one will be positioned (as at 82a) and the other will be positioned (as at 82b) in the respective sides or channels of the double-beam optical analytical instrument. The rotating chopper 110 will cause the radiant beam from the light source at 98 to alternately pass through the "a" and the "b" side at a relatively rapid rate (e.g., from a few to a few hundred cycles per second, depending on the type, and therefore the limiting frequency rate, of the photosensitive detector utilized). The synchronizing signal at 186 will allow the synchronous demodulator 184 to produce a D.C. signal which is proportional in amplitude to the difference between the intensity of the same radiant beam after it has passed through the "a" sample and the combined "b" sample and attenuator 132. Additionally, the polarity of this D.C. signal will be determined by whether the intensity of the beam after passing through the "a" cell or the intensity of the beam after passing through the "b" cell and the attenuator is greater. Therefore this signal will drive motor 140 and therefore the attenuator 132 until the two radiant beams, as received by the detector 176, are balanced or nulled in intensity. The position of the attenuator (or more directly of shaft 138) to achieve this null may then be read from the output of potentiometer 142 into a recording or visual display readout 146, preferably after the random noise fluctuations of the attenuator have been averaged out by circuit 200 as previously explained. As previously mentioned, if the variation in attenuation of the optical wedge 132 is logarithmic in nature, the potentiometer 142 may be linear; alternatively if the wedge varies in optical density in a linear manner, the potentiometer 142 is preferably logarithmic (or a logarithmic circuit is added) so as to give a direct absorbance readout in the form of Equation 8, previously noted.

Thus, the double-beam null-type optical instrument exemplified by FIGS. 3–5 may supply directly the difference in absorbance of the two sample solutions (which are otherwise identical), after the reaction in the "a" one has preceded for the longer time $T_2$, equal to $T_m - T_a$ (the abscissa change of the upper curve 10 from its start to point 16 in FIG. 1), and the "b" one has been reacting the shorter period $T_1$, equal to $T_m - T_b$, namely, at point 18 on the lower curve 12 in FIG. 1. As previously noted, the absorbance at point 18 on curve 12 will be equal to the absorbance at point 14 on curve 10, so that the slope of curve 10 over its linear portion may be directly determined, thereby yielding the concentration of the originally unknown component being analyzed (according, for example, to Equation 11). Since the times $T_2$ and $T_1$ are known (and constant for any particular series of sample tests) and the K is a known or measureable (by calibration with known "samples") constant of the reaction utilized, the desired-to-be-determined concentration may be directly read out by providing (preferably manually settable, variable) gain factors in the electrical readout system proportional to, for example, $1/K$ and $$\frac{1}{T_2 - T_1}$$

as previously noted, if a double-beam instrument of the direct readout type, rather than of the optical-null type, is utilized, Equation 6b may be used in an analogous manner to determine from the difference in absorbance, the ultimately sought concentration of the tested-for sample component.

Since the desired result is essentially the slope of the straight line segment of the reaction curve 10, the precision (and even the accuracy) in measurement is greatly increased by the present technique for such straight-line reaction curves for a number of reasons. First, the slope is determined over an appreciable part of the curve (i.e., between say, points 14 and 16), therefore reducing the percentage error in the final result for a particular uncertaisnty in the individual measurements. If a conventional technique (i.e., measuring the same sample at two different actual times) is used, a long base time will introduce other errors caused by instrument "drift" and other time-dependent uncertainties. If a shorter time interval is used in the conventional technique (to reduce the "error" contribution of longterm instrument instability), the relative (i.e., percentage error in the final measurement ($\Delta A$) necessarily increases because the measured quantity becomes smaller while the absolute error remains substantially constant. For example, if the long-term $\Delta A$ is determined between points such as 14 and 16 on curve 12, (assumed to be 10 minutes apart in time) of, for example, absorbances of 0.600 and 1.000, respectively, with an instrument giving a single measurement error of $\pm 0.002$, the present technique will yield a $\Delta A$ measurement of better than $0.400 \pm 0.004$, or 1% uncertainty. If the instrument drift is also, say, 0.002 absorbance units per minute, the conventional technique would have an added uncertainty of 0.020 (10 times 0.002) giving a value of about $0.400 \pm 0.024$ (about 6% error). If the time interval is cut to one minute in the conventional technique, the drift contribution would be brought back to 0.002, but the measured quantity, about point 14) would now be $0.400 \pm 0.002$ and $0.460 \pm 0.002$, or $0.060 \pm 0.004$ (a more than 6% uncertainty). Thus, the present invention is capable of greatly improving the percentage uncertainty in the final result because of (b) comparing two relatively wide-spaced points on the curve desired to be measured and (c) minimizing (in fact essentially eliminating) any relatively long-term instrumental "drift" effects.

An equally important improvement in precision (and accuracy) is afforded by the ability of the present technique to capitalize on another inherent attribute of, for example, straight line reaction curves. As previously noted, utilizing a moderately long (i.e., say one-half to one minute) measurement time allows the random fluctuations (i.e., instrumental and environmental background "noise") to be averaged out to a great extent without adversely affecting the actual measured quantity. Since, as noted earlier, the rate of change in absorbance ($dA/dt$) is invariable over the line segment defined by points 14 and 16, and in particular in the vicinity of points 18 (equivalent to point 14) and 16, a measurement may be made over the neighborhood of these points without change in result. In other words, if the measurement is made not at the instantaneous time $T_m$, but over the range $T_m - \Delta t_m$ through $T_m + \Delta t_m$ (as indicated by Equation 12 above), the desired-to-be-measured $\Delta A$ remains invariable, while the "noise" is (at least partially) averaged out. Thus, the signal-to-noise ratio may be increased by prolonging the measurement, whether an optical-null type or other types (e.g., where the detector signals for the "$a$" and "$b$" cells are logarithmically converted and subtracted to give the measured $\Delta A$) of double-beam (simultaneous) measurements are made.

Obviously, many details of both the automatic sampling conveyor (table) and both the type and details of the particular optical analytical instrument may be varied, depending in part on the specific samples and reactions utilized. Thus, all such details and other minor aspects of the exemplary apparatus and technique disclosed may be varied without departing from the spirit of the instant invention. Accordingly, all such variations are intended to be included within the present invention, to the extent that they may be said to fall within the scope of the appended claims.

What is claimed is:

1. The method of determining a varying physical characteristic at two different time-spaced stages of a chemical reaction of a sample, by a substantially single physical measurement at a substantially single time, comprising:
    placing equal concentration of the same said sample in two reaction vessels;
    adding substantially equal concentrations of the remaining reactants to each of said vessels in such a manner that the reaction in one vessel starts at a first known time, $T_a$, and the same reaction in the other vessel starts at a second known time, $T_b$;
    simultaneously measuring at least the relative physical characteristic of both sample vessels at a known subsequent third time, $T_m$;
    whereby such single measurement yields information concerning the physical characteristic after the identical reaction has progressed for the different known times, $T_m - T_a$ and $T_m - T_b$, respectively;
    so that the simultaneous measurement eliminates any problems of random noise fluctuations and lack of instrument stability, any need for any data-storing memory and related data-processing equipment, and any long-term operation of the instrumentation providing the physical characteristic measurement, whereby precise, rapid analysis of said sample is obtained with relatively simple testing instrumentation.

2. The method of determining a varying physical characteristic at two different stages of a chemical reaction of a sample according to claim 1, in which:
    said varying physical characteristic exhibits a linear change over a substantial period of time, so that the difference between said characteristic of one said sample reaction vessel and that of the other said sample reaction vessel remains constant over said substantial time period;
    said simultaneous measuring is performed for an appreciable duration of time within said substantial period;
    and the measurement information obtained during said appreciable duration is averaged to yield the final measurement result utilized;
    whereby the signal-to-noise ratio is greatly increased, by averaging out substantially all of the relatively short-term background noise.

3. The method of determining a varying physical characteristic at two different stages of a chemical reaction of a sample according to claim 1, in which:
    said simultaneous measuring is done by a direct comparative test of said two reaction vessels;
    whereby a single differential measurement is made and the resulting measurement data is minimally affected by systematic errors and other various errors which tend to be a specific percentage of the measured quantity in each measurement.

4. The method of determining a varying physical characteristic at two different stages of a chemical reaction of a sample according to claim 1, in which:
    said vessels move along a predetermined path at a known rate during the entire process;
    and each of said placing, adding and measuring steps are accomplished at consecutive stationary locations along said path reached in turn by said vessels.

5. The method of determining a varying physical characteristic at two different stages of a chemical reaction of a sample according to claim 4, in which:
    a large series of said pairs of vessels move along the same general path;
    whereby a large number of samples may be rapidly determined.

6. The method of determining a varying physical characteristic at two different stages of a chemical reaction of a sample according to claim 1, in which:
    said varying physical characteristic is a changing optical property;
    and said simultaneous measuring step comprises performing the same optical test on said two sample vessels at substantially the same time by means of an optical instrument.

7. The method of determining a varying physical characteristic at two different stages of a chemical reaction of a sample according to claim 6, in which:
    said changing optical property comprises the radiation absorption of the reaction mixture;
    and said optical instrument measures the relative radiation absorption of said two reaction vessels over at least some radiation spectral interval.

8. The method of determining a varying physical characteristic at two different stages of a chemical reaction of a sample according to claim 7, in which:
    said optical instrument is of the double-beam type;
    and said optical test comprises obtaining direct comparative data as to the relative value of said absorption by both sample vessels.

9. The method of determining a varying physical characteristic at two different stages of a chemical reaction of a sample according to claim 8, in which:
    said double-beam optical instrument is of the optical-null type, in which the more intense beam is optically attenuated to reduce its intensity to that of the less intense beam;
    and said optical test comprises determining the value of such optical attenuation necessary to cause such nulling of the difference in said two beams at the least some said spectral interval;
    whereby the difference in absorbance of said sample vessels at said two different stages of reaction is directly obtained.

10. An apparatus for determining a varying physical characteristic at two different time-spaced stages of a chemical reaction of a sample, by means of a single physical measurement at a substantially single time, comprising:
 at least one pair of substantially identical reaction vessels;
 means for placing substantially equal quantities of the same said sample into each of said reaction vessels;
 means for adding substantially equal quantities of the remaining reactants into each of said reaction vessels in such a manner that the reaction in one vessel starts at a first known time, $T_a$, and the same reaction in the other vessel starts at a second known time, $T_b$;
 means for substantially simultaneously measuring at least the relative physical characteristic of both said sample vessels at a subsequent third time, $T_m$;
 and means for reading out at least the difference in said physical characteristic of said two samples;
 whereby precise, rapid analyses of said sample is obtained with relatively simple measuring instrumentation.

11. The apparatus according to claim 10, in which:
 said varying physical characteristic exhibits a linear change over a substantial period of time, so that the difference between said characteristic of one said sample reaction vessel and that of the other said sample reaction vessel remains constant over said substantial time period;
 said simultaneously measuring means comprises means for measuring at least said relative physical characteristic of both sample vessels for an appreciable duration of time within said substantial period;
 and data-averaging means are operatively corrected between said measuring means and said reading-out means, for smoothing out relatively short-term fluctuations in the measured value of said difference in said physical characteristic;
 whereby the signal-to-noise ratio in the finally read-out measurement data is greatly increased by averaging out substantially all of the relatively short-term background noise.

12. The apparatus according to claim 10, in which:
 said simultaneously measuring means is of the type which directly compares said physical characteristic;
 whereby a single differential measurement is made, which is minimally affected by systematic errors and other various errors which tend to be a definite percentage of the measured quantity in each measurement.

13. The apparatus according to claim 10, in which:
 sample conveyor means are provided for moving said pair of reaction vessels along a predetermined path at a known constant rate;
 said placing means, said adding means and said measuring means being positioned along said predetermined path at consecutive stations so as to be reached in turn by said vessels.

14. The apparatus according to claim 13, in which:
 a large series of said pairs of reaction vessels are provided along said sample conveyor means;
 whereby a large number of samples may be rapidly determined.

15. The apparatus according to claim 10, which:
 said means comprises an optical instrument for determining said physical characteristic.

16. The apparatus according to claim 15, in which:
 said optical instrument is of the type that measures the relative radiation absorption over at least some radiation spectral interval of said two reaction vessels.

17. The apparatus according to claim 16, in which:
 said optical instrument is of the double-beam type;
 whereby comparative data as to the relative value of said absorption by both said sample vessels is directly obtained.

18. The apparatus according to claim 17, in which:
 said double-beam optical instrument is of the optical-null type, comprising variable attenuating means for reducing the intensity of the more intense beam to that of the less intense beam;
 means are provided for varying said attenuating means until the originally more intense beam, as attenuated, is balanced in intensity with the less intense beam;
 and indicating means, operatively connected to said attenuating means, are provided for determining the value of optical attenuation necessary to cause such nulling of the difference in intensity of said two beams;
 whereby the difference in absorbance of said two sample vessels is direclty obtained.

References Cited

UNITED STATES PATENTS 3,018,224  1/1962  Ferrari ____________ 23—230 X
3,478,111  11/1969  Bruce _____________ 23—230 X

OTHER REFERENCES

Blaedel et al., "Continuous Analysis by Measurement of the Rate of Enzyme Catalyzed Reactions," Analytical Chemistry, vol. 34, No. 3, March 1962, pp. 388–394.

MORRIS O. WOLK, Primary Examiner

R. E. SERWIN, Assistant Examiner

U.S. Cl. X.R.

23—253; 195—103.5; 356—235